United States Patent [19]

Schelp

[11] 4,041,699
[45] Aug. 16, 1977

[54] HIGH TEMPERATURE GAS TURBINE

[75] Inventor: Helmut R. Schelp, Pacific Palisades, Calif.

[73] Assignee: The Garrett Corporation, Los Angeles, Calif.

[21] Appl. No.: 645,004

[22] Filed: Dec. 29, 1975

[51] Int. Cl.² ............... F02C 7/00; F02C 7/12
[52] U.S. Cl. .................. 60/39.55; 60/39.59; 60/39.66; 60/39.51 R
[58] Field of Search ............ 60/39.05, 39.53, 39.55, 60/39.58, 39.59, 39.51 R, 39.66, 39.71; 415/114

[56] References Cited

U.S. PATENT DOCUMENTS

| 2,369,295 | 2/1945 | Planiol et al. | 415/114 |
| 2,869,324 | 1/1959 | Foote | 60/39.05 |
| 3,238,719 | 3/1966 | Harslem | 60/39.55 |
| 3,600,890 | 8/1971 | White et al. | 415/114 |
| 3,921,389 | 11/1975 | Kawaguchi | 60/39.05 |
| 3,938,324 | 2/1976 | Hammond et al. | 60/39.66 |

Primary Examiner—Carlton R. Croyle
Assistant Examiner—L. J. Casaregola
Attorney, Agent, or Firm—Jack D. Puffer; Albert J. Miller

[57] ABSTRACT

A gas turbine engine is disclosed in which water is used to cool the turbine. The water is turned to steam in the hot turbine; is super-heated, and then injected into the combustor to aid in the gasification of the fuel, to reduce the flame temperature and improve emissions, as well as increasing the specific output of the engine.

10 Claims, 3 Drawing Figures

HIGH TEMPERATURE GAS TURBINE

BACKGROUND OF THE INVENTION

This invention relates to gas turbine engines in general and in particular to gas turbine engines having fluid cooled turbines.

In order to increase the power output and efficiency of gas turbines, it is desirable to operate such turbines at as high a turbine inlet temperature as possible. Presently these temperatures are limited to a range of 1800° to 2000° Fahrenheit, primarily because of temperature limitations of the metal alloys used in the rotating components. Higher inlet temperatures can be used if the turbine blades can be successfully cooled. In larger turbine engines air cooling of blades is successful, however, in small turbine engines the blades are of a substantially smaller size and do not provide sufficient metal thickness to allow air cooling passages of effective size.

Water cooling of turbine blades has been successful in the past in large stationary power generating plants. However, in order to avoid excessive water consumption it has been necessary to provide for condensation and recirculation of the cooling water. For small gas turbine engines, particularly in vehicle applications, the inclusion of such a condenser and recirculating system is impracticable.

SUMMARY OF THE INVENTION

The present invention overcomes these disadvantages by providing a small gas turbine engine in which the turbine is cooled by the injection of water into the turbine hub and into blind passages in the blades. Upon contact with the hot turbine surfaces the water is changed to steam and is discharged to a heat exchanger which utilizes turbine exhaust gases for further heating the steam. The steam is then injected into the combustor along with the fuel and compressed air from the engine compressor where it is used in the gasification process of the liquid fuel in the first stage of a two stage combustion process. During this stage of the process some of the steam is dissociated into $H_2$ and $O_2$ thereby increasing the heating value of the fuel. In addition to vaporizing and gasifying the fuel in a fuel rich environment the steam also increases the mass flow through the turbine wheel and thus increases the specific power of the engine.

Another advantage of this invention is that the addition of the water vapor to the combustor substantially reduces the emissions of nitrous oxide by lowering the flame temperature. In the prior art devices at gasification temperatures below those obtained with a 0.5 stoichiometric air-fuel ratio a catalyst was required in order to prevent the formation of carbon or soot. The injection of water vapor enriches the fuel with hydrogen which allows for a very lean air-fuel mixture to be used in the second stage thus lowering the NOX formation without an increase in smoke. The addition of a catalyst to the combustor of this invention would further improve performance of a wide variety of air-fuel mixture is required by the load schedule of the engine.

Thus there is provided a means for cooling the turbine allow higher turbine inlet temperatures with their attendant advantages as well as a means for further utilizing the exhaust steam in increasing the engine's power output.

DESCRIPTION OF THE PREFERRED EMBODIMENT

Figure 1:
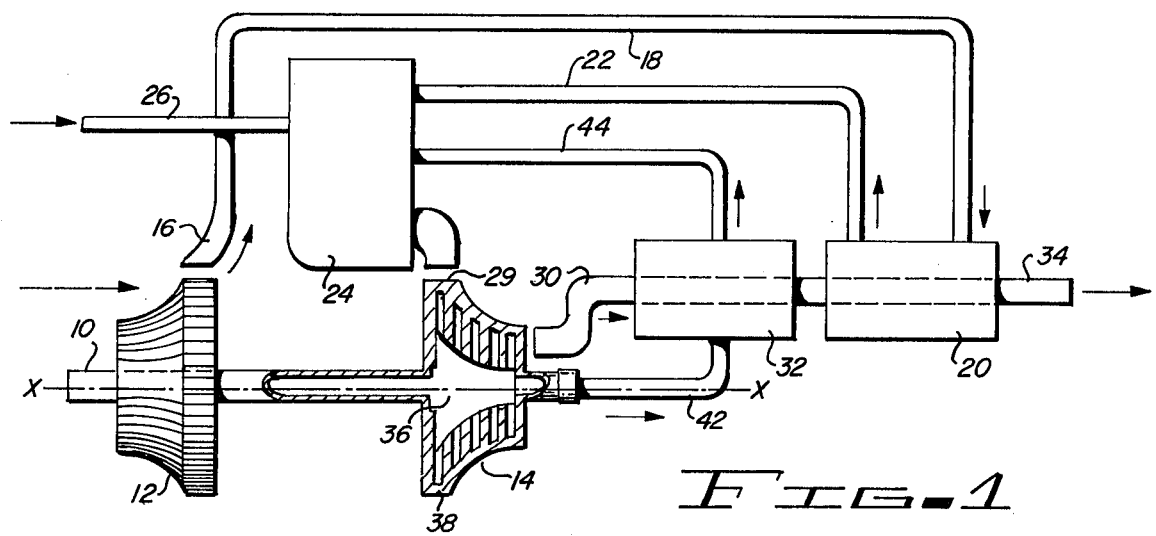
FIG. 1 is a schematic diagram of the gas turbine engine incorporating the engine.

Referring now to FIG. 1, there is shown a general schematic of the system which comprises a shaft 10 supported for rotation about axis X—X on bearings of any known type (not shown). Attached to the shaft 10 for rotation therewith is a compressor 12, shown here as a centrifugal compressor, and a turbine 14 shown as a radial inflow turbine. Air enters the inlet to the engine (not shown) and is compressed by the compressor 12 and discharged from the compressor into the diffuser member 16. From the diffuser it is conducted by means of conduit 18 into a recuperator heat exchanger 20. The outlet from the recuperator 20 shown at conduit 22 connects the recuperator to a combustor means 24. The combustor is supplied with fuel through a conduit 26 from a source not shown. The compressed air is heated in the combustor and is discharged to the turbine 14 at turbine inlet 29. The exhaust from the turbine discharges into conduit 30 which passes the exhaust gas through a super heater member 32 and then into recuperator 20. From there it is exhausted by means of conduit 34.

The cooling liquid for cooling turbine 14, indicated here as water, is introduced into the system through the hollow shaft 10 which supports the rotating components of the engine. The water is conducted through the shaft into the cavity 36 inside of the turbine hub. Radiating from the cavity 36 are a series of cooling passages 38 which extend from the hub out into the blade portions of the turbine. The water is heated by the hot turbine surfaces, becomes steam and is discharged through the back side of the turbine through outlet 40. It is then conducted by means of conduit 42 into the super heater 32. From the super heater it is conducted by means of conduit 44 into the combustor where it is utilized in a manner to be described below.

Figure 2:
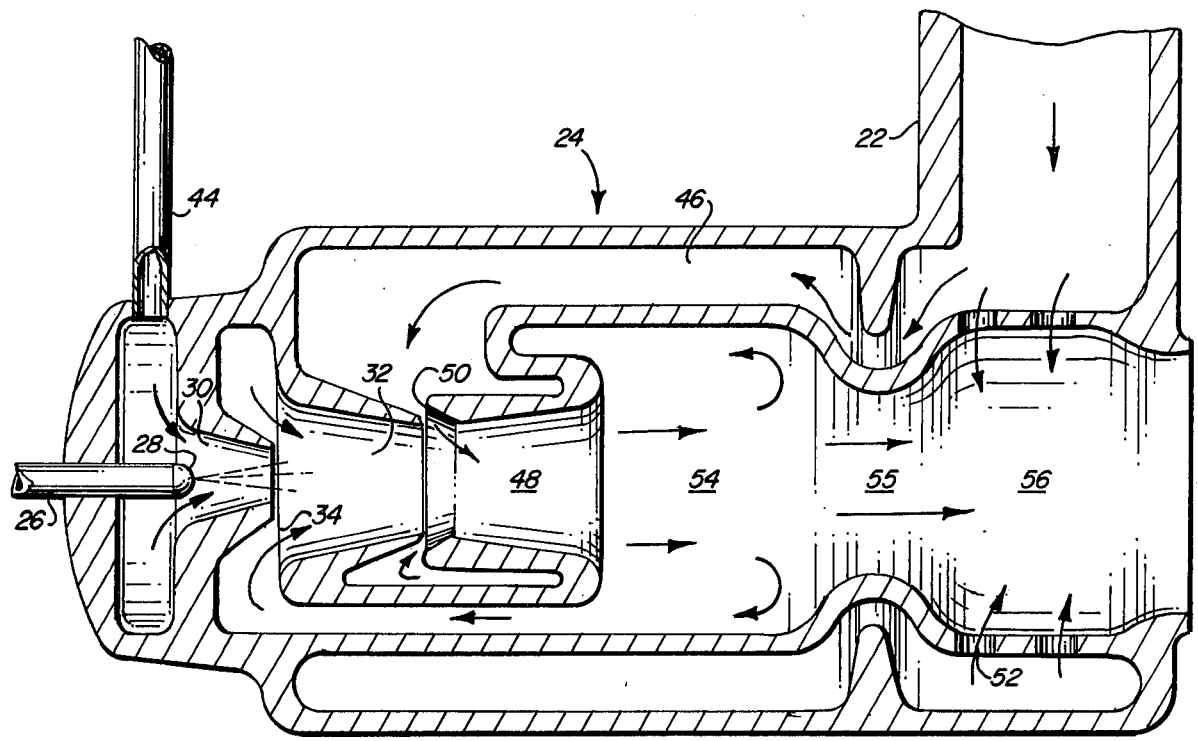
FIG. 2 is a sectional view of the combustor of FIG. 1.

Referring now to FIG. 2, there is shown a sectional view through the combustor 24 of FIG. 1. Fuel is supplied to the combustor through conduit 26 and is introduced into a premixing chamber 30 by means of nozzle 28. Steam from the super heater is introduced into the combustor by means of conduit 44 into the premix chamber 30 where it is mixed with fuel. The fuel and steam mixture is then introduced into a vaporization and mixing chamber 32 where it is mixed with air from the recuperator which enters the vaporization chamber through openings 34 in the combustor wall along with recirculating gas from the primary combustion and gasification chamber 54.

Primary air from the compressor 12 is received from the recuperator 20 through conduit 22 and is introduced into the combustor. A portion of the air from conduit 22 enters a toroidal chamber 46 which surrounds the combustion area of the combustor. Air from this chamber is introduced into the second mixing chamber 48 through means of openings 50 in the wall. Secondary air enters the combustor from conduit 22 by means of openings 52 which communicate directly with the conduit 22 on one side and with the toroidal chamber 46 on the other side. The fuel, steam and air mixture is gasified and ignited in chamber 54 where it burns in a fuel rich atmosphere in this primary combustion zone. There is provided a restriction 55 between the two combustion zones to cause a portion of the fuel-rich mixture to recirculate by means of opening 34 into the mixing chambers 32 and 48. This recirculation air at a temperature of approximately 700° C aids in gasification of the air-fuel mixture. This mixture is then diluted in chamber 56 by diluent air which enters the chamber through openings 52. Secondary combustion occurs in this chamber in a lean air-fuel atmosphere which aids in reduction of objectionable emissions.

Figure 3:
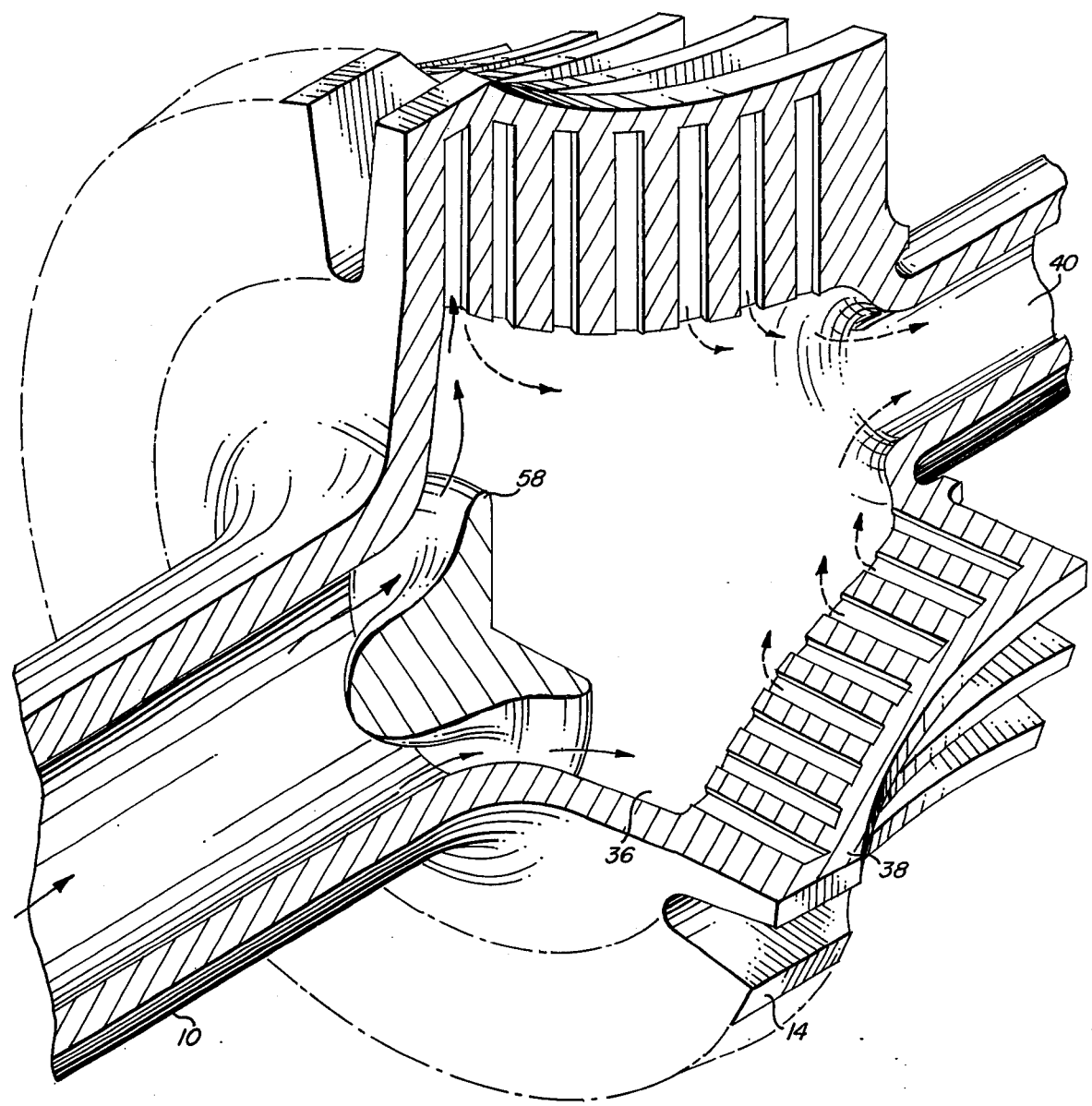
FIG. 3 is a partial sectional view of the turbine of the instant invention.

Referring now to FIG. 3, there is shown a partial sectional view of the details of the turbine 14. Water is introduced through the hollow shaft 10 and enters the chamber 36 in the hub of the turbine by means of openings provided around a plug member 58. The water mixture is forced by centrifugal force into the openings 38 in the blades of the turbine and flows to the outer end of these openings. The water is vaporized in these openings and steam returning through the same openings is then exhausted through conduit 40 on the exhaust side of the turbine. The use of a superheater is a practical, optional means for constructing the embodiment disclosed. A heat exchanger of any known type could be used. However, in order to withstand the high exhaust gas temperature it would have to be made of expensive super alloys. The use of the superheater provides two advantages. First, all of the energy contained in the steam is returned to the cycle. Some energy would be lost using a conventional heat exchanger since such devices are less than 100% efficient. Secondly, the superheater can be made from more conventional metals and thus be provided at a lower cost.

Thus it can be seen there is provided herein a high temperature gas turbine power plant which operates on a modified open Brayton cycle with the application of water or water-methanol to the engine for cooling the turbine and further processing this fluid in the combustor to aid in the gasification of the fuel, reduce the combustor flame temperature for favorable emission's correction and to increase the specific power of the engine by increasing the mass flow through the engine.

Obviously many modifications and variations of the present invention are possible in light of the above teachings. It is therefore to be understood that within the scope of the appended claims the invention may be practiced otherwise than as specifically described.

What is claimed is:

1. A gas turbine engine comprising:
a shaft mounted for rotation about an axis;
compressor means attached to said shaft for rotation therewith;
turbine means attached to said shaft for rotation therewith, said turbine means having internal cooling passages therein and cooling liquid inlet and outlet openings;
first conduit means connected to the inlet opening in said turbine for conducting cooling liquid to said turbine;
combustor means for receiving cycle fluid from said compressor and fuel from a source of combustible fuel, said combustor comprising:
a first mixing chamber connected to said source of combustible fuel and said second conduit means for mixing said fuel and cooling liquid;
a second mixing chamber connected to receive the contents of said first mixing chamber and cycle fluid from said compressor means for vaporizing and mixing said fuel and cooling liquid mixture;
a first combustion chamber for receiving the contents of said second mixing chamber for gasification and primary combustion therein;
a second combustion chamber separated from said first combustion chamber and connected to receive the contents of said first combustion chamber and additional cycle fluid from said compressor for secondary combustion therein;
second conduit means connected to the outlet of said turbine cooling passages for conducting cooling liquid from said turbine to said combustor and combining it with said cycle fluid;
third conduit means for conducting the products of combustion of said combustor to said turbine for extraction of work therefrom; and
at least one heat exchanged connected in said second conduit means between the outlet opening of said turbine passages and the inlet to said combustor, said heat exchanger receiving heat from the exhaust gas from said turbine and transferring said heat to the cooling liquid from said turbine.

2. The gas turbine engine according to claim 1 wherein said combustor further comprises restrictor means between said first combustion chamber and said second combustion chamber for recirculating a portion of the contents of said first combustion chamber to said mixing chambers.

3. A gas turbine engine comprising:
compressor means mounted for rotation about an axis for compressing the cycle fluid;
turbine means mounted for rotation about an axis for extracting work from said cycle fluid, said turbine means having internal cooling passages and an inlet opening and an outlet opening for conducting cooling liquid through said turbine;
combustor means for receiving the cycle fluid from said compressor and connected to a source of combustible fuel, said combustor discharging its contents to said turbine for expansion therethrough, said combustor comprising:
a first mixing chamber receiving fuel from said fuel source and cooling liquid from said turbine means wherein said cooling liquid and said fuel are mixed;
a second mixing chamber connected to receive the contents of said first chamber and a portion of said cycle fluid from said compressor for vaporizing the mixture;
a first combustion chamber for receiving the mixture from said second mixing chamber;
a second combustion chamber separated from said first combustion chamber and connected to receive the contents of said first combustion chamber and a portion of said cycle fluid from said compressor for secondary combustion therein;
shaft means mounted for rotation about the axis of said turbine and said compressor for rotationally supporting said compressor and said turbine for rotation about said axis; and
conduit means connected between the outlet opening of said turbine cooling passages and said combustor means for conducting said cooling liquid to said combustor.

4. A gas turbine according to claim 3 wherein said combustor further comprises restrictor means between said first combustion chamber and said second combustion chamber for recirculating a portion of the mixture of said first combustion chamber to said mixing chambers for promoting gasification of said mixture.

5. The gas turbine engine according to claim 4 wherein said shaft is a hollow shaft having an axial opening therethrough, said opening communicating at one end with the inlet opening of said turbine cooling passages and at the other end to the outlet opening of said turbine cooling passages.

6. The gas turbine engine of claim 5 and further comprising a heat exchanger means connected between the outlet opening of said turbine cooling passages and the inlet of said combustor means, the heat exchanger receiving cycle fluid exhausted from said turbine means and transferring heat therefrom to the cooling liquid from said turbine.

7. The gas turbine engine according to claim 6 wherein said heat exchanger is a superheater.

8. The gas turbine engine according to claim 7 wherein said cooling liquid is water.

9. The gas turbine engine according to claim 7 wherein the cooling liquid is a mixture of water and methanol.

10. A gas turbine engine according to claim 7 wherein cooling liquid is an aqueous solution.

* * * * *